United States Patent [19]

Stevens

[11] 4,159,496

[45] Jun. 26, 1979

[54] SAFETY DEVICE FOR HOSPITAL BEDS EMPLOYING ELECTRIC CURRENT

[75] Inventor: William M. Stevens, Loveland, Ohio

[73] Assignee: Randam Electronics, Inc., Cincinnati, Ohio

[21] Appl. No.: 835,499

[22] Filed: Sep. 22, 1977

[51] Int. Cl.[2] ............................................. H02H 7/00

[52] U.S. Cl. ............................................. 361/1; 5/68; 307/115; 361/193

[58] Field of Search ................ 318/103; 307/113, 115; 361/1, 23, 191, 193; 5/68

[56] References Cited

U.S. PATENT DOCUMENTS

| | | | |
|---|---|---|---|
| 3,840,780 | 10/1974 | Sons | 361/23 |
| 3,913,153 | 10/1975 | Adams et al. | 5/68 |
| 3,931,481 | 1/1976 | Jackson | 361/193 |
| 3,961,319 | 6/1976 | Asberry | 5/68 |
| 4,044,286 | 8/1977 | Adams et al. | 5/68 |
| 4,083,041 | 4/1978 | Bennice | 5/68 |

*Primary Examiner*—Gerald Goldberg
*Attorney, Agent, or Firm*—Eugene F. Friedman

[57] ABSTRACT

A safety circuit employing pulse transformers to protect hospitalized patients from high-voltage currents. The circuit finds use on switches controlling the operation of a hospital bed's motors, as well as on other types of controls. The pulse transformers prevent the motor's high-voltage levels from reaching the switching devices contacted by the patient. To operate the bed, the circuit provides a high frequency, low-voltage current to the pulse transformer which transfers it to a controlling triac. When in receipt of this current, the triac assumes a conducting state. A separate frequency generator provides this high-frequency current. The circuit may employ electronic devices to control the performance of the bed or other load. CMOS components operate satisfactorily with nonregulated voltages, produce delay periods with small capacitances, and consume little power. The CMOS components may, however, require a buffer in order to provide the pulse transformers with sufficient current. Furthermore, the circuit may require protecting diodes to prevent current spikes produced at the motors from reaching the CMOS components.

35 Claims, 5 Drawing Figures

SAFETY DEVICE FOR HOSPITAL BEDS EMPLOYING ELECTRIC CURRENT

BACKGROUND

Hospital beds frequently employ electric devices to accomplish various tasks. The most frequent example of such devices involves the use of one or more electric motors to change the bed's configuration. Thus, the head portion, the knee portion, and the overall height of the bed may change to suit the patient's needs or desires. Additional devices may include lights, fans, or even call buttons for the nurses.

In most instances, the patient himself may operate the devices to suit his convenience. He does so by actuating various switches placed in his proximity. These switches normally remain near the patient in order that he may adjust his environment when the desire strikes him. Consequently, the patient may contact the switches even at a time when he does not intend to operate the device connected to them.

Thus, the likelihood for the patient to contact the switches in his proximity continually exists. More significantly, the patient may also make contact with the electrical current controlled by the switches. Especially can this become a problem in light of the fact that metal components of the bed, light stands, and other furniture continually surround the patient. Furthermore, liquids of almost every description remain ubiquitously near the patient and may spill upon him during his normal activities. These liquids can reduce the normal skin electrical resistance and also provide a path for current to actually reach the portion of the switches contacted by the patient. Thus, the usual activities of the patient in bed may easily result in electric current from the connections to the switches contacting his skin. Moreover, the skin may have contemporaneously suffered reduced resistance and protection because of the liquids in his proximity. Should a significant potential or current thus pass to the patient, he could suffer a serious or even fatal electrical shock. This becomes a particular danger since the patient may have suffered reduced strength and concomittantly increased susceptibility due to his illness.

All manufacturers of electrical devices actuatable by a patient must take cognizance of this potential for shock. They must, therefore, devise a scheme that avoids high voltage, current or electrical energy levels in close proximity to the switches that a patient may contact. Accordingly, hospital bed manufacturers have incorporated various systems for keeping the high voltage, current or electrical energy levels necessary to operate the bed away from the patient.

One manufacturer has employed a pneumatic system which provides a barrier of air between the patient's switches and the electric current. When a patient actuates a switch, air pressure flows along a conduit to turn on or off a piece of electrical equipment, such as a motor.

The pneumatic system, however, suffers from considerable shortcomings that limit its actual commercial utility. First, this type of hospital bed requires all the components for a complete pneumatic system. Thus, a motor for the air pump as well as fluid-tight conduits become essential items, drastically increasing the bed's cost. Furthermore, the conduits can degenerate with time and lose their fluid-tightness. Moreover, sharply bending the conduits can completely and inadvertently close them off, rendering the system useless.

A. P. Petzon et al., in their U.S. Pat. No. 3,716,876, show a hospital bed employing lights and photo cells to separate the high voltage of the electrical motor from the low voltage used in the switches contacted by the patient. Again, however, the utilization of the light system requires the addition of expensive components, as well as introducing reliability and maintenance problems. Moreover, a foreign object becoming lodged between the lights and the photo cells can likely render the system totally inoperative.

Moreover, the light bulb and photo cells have a very slow response time. Stated otherwise, the bulb's performance displays a hysterisis effect. This lag becomes particularly troublesome when a person operating a motor in one direction rapidly fluctuates the switch to move it in the opposite direction. This may happen, for example, if the bed section moved beyond the desired point. With the slow response time of the light bulbs, especially in turning off, this attempted rapid reversal of the motor may actually result in power passing simultaneously through both the motor's forward and reverse windings. Current simultaneously flowing through both windings of a large motor can possibly damage it. It may also destroy the solid-state switches controlling the motor's current.

The use of reed relays to separate high voltage from the patient's controls appears in, inter alia, U.S. Pat. No. 3,913,153 to J. S. Adams et al. While the bed shown in their patent has worked satisfactorily in the field, it has only the small amount of insulation in the reed relay itself to isolate the circuitry in patient's controls from the high voltages used to power the motors. Moreover, reed relays represent expensive items to add to the circuit.

Additionally, reed relays present a reliability problem. The contacts have on occasion stuck together and remained closed, even after the discontinuance of the current, which should cause them to open. This continued closure of the contacts maintains the current flow to the particular motor involved. Upon the actuation of the switch to operate the motor in the reverse direction, that motor will again receive current in both its forward and reverse windings. As discussed above, the current in both windings of the motor may possibly affect it deleteriously. More importantly, these circuits with reed relays use them to operate triacs which control the current received by the motors. Supplying current through both of the triacs controlling the forward and reverse windings of a motor can damage and likely destroy them.

Furthermore, the reed relays do not represent a power-transferring device. The energy from the coil half of the reed relay simply cannot pass over to its coupled triac to turn on the motor. Accordingly, the circuit requires the expense of a further power supply to energize the triac coupled to the reed relay.

Electric motors in other circumstances, have also submitted to electronic control. J. Futamura, in his U.S. Pat. No. 3,686,557, switches a reversible motor on in either of its directions through the use of triacs coupled through transformers to oscillators. The circuit allows the appropriate oscillator to keep its coupled triac conducting sufficiently long for the motor to effect a needed change in a piece of controlled apparatus. However, no need exists for Futamura to guard his circuit from the voltages operating the motor and, consequently, he does not attempt this task.

In his U.S. Pat. No. 3,898,553, U. M. Van Bogget provides a circuit which periodically switches the current to a load on and off. He uses a triac as the specific switching element. To maintain the triac in the conducting state, he provides it with oscillator pulses having a frequency approximately twenty to forty times as great as that of the alternating current received by the load. The high pulse rate assures that the triac turns on promptly when desired. It need not wait an appreciable portion of a cycle of the alternating current supplied to the load.

Van Bogget, however, simply relates to the establishment of time intervals for the load to remain on or off. He has no concern for protecting any part of the circuit from the high voltages operating the load. Nor does he relate at all to the manually controlled switching devices as used in hospital beds. More specifically, he also provides no protection for such manual switches from the high voltages operating the load. Consequently, he proves of no benefit for hospital beds.

H. Wakamatsu et al. 's U.S. Pat. No. 3,986,093 employs a motor to passively wrap an automotive seat belt around a passenger in an automobile. They control the motor through the use of CMOS circuits which receive, as inputs, the positions of various switches connected to the door, the seat, and like. A resistance-capacitance (RC) segment coupled to the input of the CMOS components provides a slight delay to reduce the "chattering" in the circuits for the door seat switch. Alan R. Miller, in his article "Adaptive Motor Starter Delays When Necessary" in *Electronics* of July 24, 1975, produces an RC delay with CMOS components controlling the motor of an air conditioner. In *IBM Technical Disclosure Bulletin* 13, 519 (1970), D. J. Kostuch, in his article "Time Delay for Mosfet Integrated Logic", provides a delay in the excitation of the output of a Mosfet integrated circuit. However, the Mosfet circuit's output returns to its normal state promptly after the disappearance of the exciting signal. Again, none of these control circuits discuss preventing the voltage utilized by a load from reaching switches contacted by individuals.

The *G. E. SCR Manual,* 5th edition, 1972, on pages 115–116, 348–349, and 265, and the *Guidebook of Electronic Circuits* by John Marcus, 1974, discuss the use of SCRs, triacs, and thyristers to control an a.c. current passing to various loads including motors and light bulbs. The circuits employ pulse transformers to electrically isolate one section of the circuit from another. They do not, however, protect one portion of the circuit having very low voltages from a separate portion operating at high voltages. Accordingly, they do not satisfy the needs of hospital beds which can allow only very limited amounts of current to pass to the switches contacted by a patient.

SUMMARY

The typical adjustable hospital bed includes a frame and at least one adjustable section coupled to the frame. The adjustable section may occupy and move between at least two different positions relative to the frame.

The electric genre of bed also includes a motor or some electric power device to move the adjustable section between its positions. Naturally, the power device utilizes electric current having a particular frequency.

A switch, coupled to the power device, controls its actuation. The switch typically has at least two configurations, with one of the configurations corresponding to the "off" state of the power device.

The electric motor or power device generally requires a large amount of current in order to move the bed section. This current must not pass to the switch which the patient contacts. Consequently, the bed also includes a safety means which limits the current passing to the switch to below a predetermined amount. That amount, of course, typically will not deleteriously affect even a seriously ill and weakened patient, even upon direct contact with the patient's moistened skin.

An inexpensive but more reliable safety device includes, as one of its components, an interrupt means coupled to the electric power device. It typically has two states. In the first of the states, it prevents the flow of electric current having, specifically, the particular frequency mentioned above from reaching the power means. In the second state, the interrupt device typically allows this current to reach the power means, or motor, to move the adjustable bed section.

The safety device must also have a frequency generator which produces an electric current with a second frequency different from that of the current energizing the power means. Typically, this generator will provide a current having a frequency several times greater than that of the current used by the bed's motor. The latter, of course, lies very close to 60 Hz., which represents the usual current available at a building's outlets. The greater frequency of the generator's current, in particular, allows the use and control of a triac without losing an appreciable part of the 60 Hz. house current's duty cycle.

Lastly, a discriminating means forms the barrier between the large currents supplied to the bed's power device and the low current which reaches the patient's switches. This discriminator has an input coupled to the frequency generator and the patient's switches. The discriminator's output couples to the interrupt means.

When the switch occupies its first, or "on", configuration, the discriminator will pass current to the power means, or motor, in the bed. Specifically, with the switch in this configuration, the discriminator, while receiving the second-frequency current, will place the interrupt means in the second of its two states. Then, the interrupt means will allow current to flow to the motor.

The discriminator must also serve to prevent the current used by the motor from passing to the patient's switches. It does this by preventing the passage from its output to its input of more current of the first or house frequency than a predetermined, safe amount. Yet, it allows the second, usually high, frequency current to pass from its input to its output to control the interrupt means.

A pulse transformer represents a suitable component for use as the discriminator. It can effectively block the passage from its secondary to its primary winding of the 60 Hz. current. Yet, it allows high frequency pulses to pass from its input to its output to trigger the triac controlling the current to a bed's motor. Operating in this fashion, a pulse transformer becomes a safety device for limiting the total current available at the switches contacted by the patient. It can perform this function effectively, though it may not necesssarily operate to electrically isolate at the same time.

Lastly, the power supplied to the switches themselves to control the pulse transformer must remain below the predetermined safe amount. If the high frequency current which passes through the pulse transformer can also reach the switches, then it too must remain below that amount. In that event, the frequency generator must not produce a greater amount of current than that safe amount.

When used to control elements other than the bed's motor, the safety device includes a switch which the patient may place in either of at least two different configurations. An interrupt means again couples to the load. In the first of its two states, it prevents the flow of electric current having a first frequency, the usual house frequency, from reaching the load. However, the interrupt means will assume the second of its states when it receives current of a second frequency provided by a frequency generator.

A discriminator again provides the basic protection for the patient against the high currents required by the load. When the switch occupies its first configuration, the discriminator can pass the current of the second, usually higher, frequency from its input to the output. This high frequency current then passes to the interrupt means and places it in the conducting state to allow the lower frequency current to reach the load. At the same time, however, the discriminator prevents the low frequency current from traveling from its output to its input connections to reach the switches contacted by the patient. At the maximum, it must limit the low frequency current passing from its output to its input to below the safe amount.

DETAILED DESCRIPTION

Figure 1:
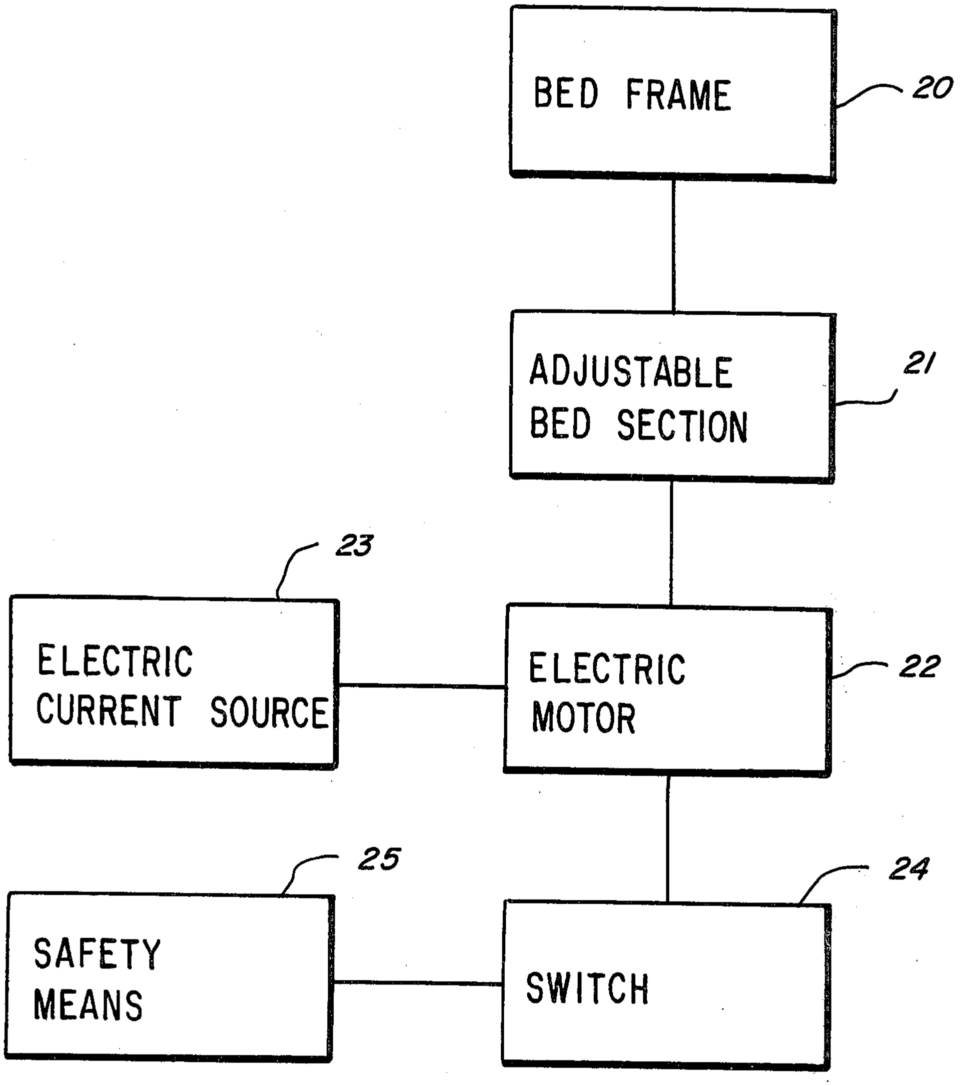
FIG. 1 gives a block diagram of a hospital bed with adjustable sections moved to different positions by an electric motor under the control of switches insulated by a safety device.

The block diagram of FIG. 1 includes the bedframe 20 supporting one or more adjustable bed sections 21. The electric motor 22, operating on power from the electric current source 23, moves the bed section 21 between these positions.

The switch 24 controls the operation of the motor 22 in moving the bed section 21. The safety means 25 couples to the switch 24 and protects it from the high voltage or current utilized by the electric motor 22. As a result, the switch 24 has a sufficiently low current and voltage that even direct contact with moistened skin will not present a hazard of harm to an individual.

Figure 1A:
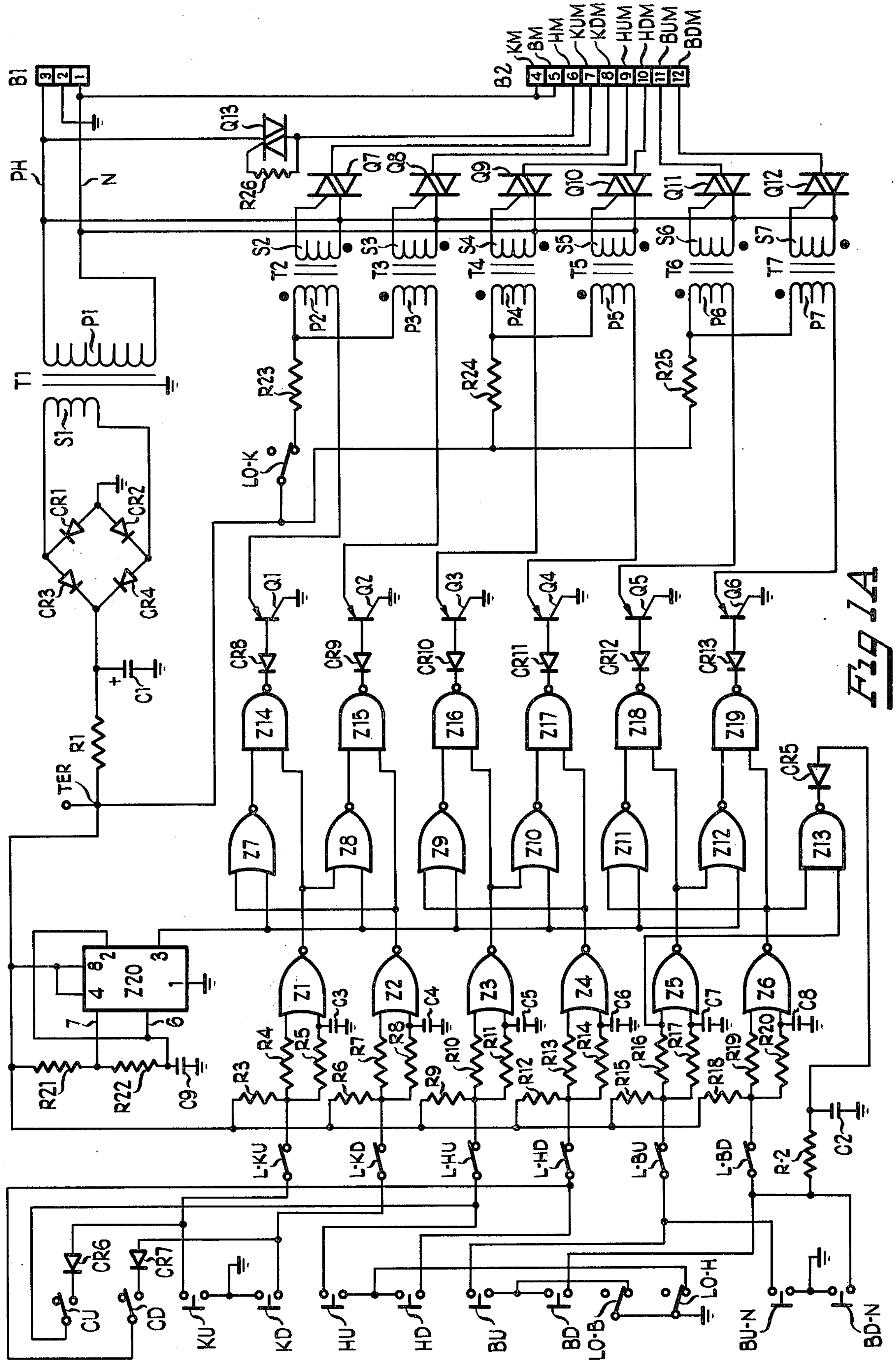
FIG. 1A shows a circuit for a hospital bed employing pulse transformers to prevent the high voltage used by the motors from reaching the switches contacted by a patient. It also employs logic components to determine which of the motors will operate in response to the actuation of the switches.

The circuit of FIG. 1A derives its power from the bus bar B1 located in the upper right-hand corner. The neutral supply appears at connection 1 of the bus bar B1 and travels along the lead N to the primary winding P1 of the transformer T1. The phase supply appears at connection 3 of the bus bar B1. It passes along the lead PH which supplies it to the other end of the primary P1.

The transformer T1 then supplies its secondary winding S1 with a stepped-down voltage for the "safe" or low-voltage side of the circuit. The ratio of the number of turns of the secondary winding S1 to that of the primary P1 determines the voltage on the secondary side S1 of the transformer T1. In particular, it stays at a level which can provide no danger to the occupant of the hospital bed.

The four diodes CR1, CR2, CR3, and CR4 constitute a full-wave bridge rectifier, which converts the a.c. voltage from the secondary winding S1 to d.c. The resistor R1 and the capacitor C1 filter the rectifier output to provide a relatively steady d.c. voltage.

The left side of the circuit diagram of FIG. 1A includes sundry switches for controlling the flow of the d.c. current thus provided. Basically, the switches fall into five categories. The first of these includes the knee-up KU, the knee-down KD, the head-up HU, the head-down HD, the bed-up BU, and the bed-down BD switches. These switches lie close to the patient for use at his discretion. Depending upon the configurations of the other switches in the circuit, these switches may perform the indicated functions. Thus, depressing the knee-up KU switch may, in fact, cause the knee section of the bed to elevate.

The second category of switches includes the contour-up CU and the contour-down CD switches. The contour-up CU switch couples the knee-up KU switch to the head-up HU switch. As a result, depressing the head-up HU switch will also cause the knee section to elevate so long as the knee section has not reached its uppermost configuration. Similarly, the contour-down CD switch causes the knee section to lower when the patient depresses the head-down HD switch.

The third category of switches is not readily accessible to the patient. The nurse's bed-up BU-N and bed-down BD-N switches fall within this category. They simply allow the nurse, standing for example at the foot of the bed, to effectuate the indicated operations.

The fourth category similarly does not admit of facile operation by the patient. These include the lock-out bed LO-B, the lock-out head LO-H, and the lock-out knee LO-K switches, with the last one of these appearing towards the right hand side of the diagram.

The limit switches represent the final category and require no manual actuation whatsoever. It includes the limit knee-up L-KU, the limit knee-down L-KD, the limit head-up L-HU, the limit head-down L-HD, the limit bed-up L-BU, and the limit bed-down L-BD switches. When the appropriate bed section has reached its limit of travel in the indicated direction, the appropriate switch opens. In that configuration, it stops its motor from operating in the manner that would attempt to move that bed section further in that same direction.

At the right hand side of the diagram appear the connections 4 to 12 in the bus bar B2 which lead to the motors of the bed. The connections 4, 5, and 6, respectively, to the knee motor KM, the bed motor BM, and the head motor HM, do not submit to the control of the switches described previously. Rather, they simply provide a return route to the house current in order to complete the electric circuits for the motors.

The connections 7 to 10, however, do permit control by the circuit's switches. These connections come in pairs which connect to the two windings on a reversible motor. Thus, the connection 7, KUM, connects to the winding of the knee motor that will cause it to elevate the knee. Similarly, the connection 8, KDM, connects to the winding of the knee motor that will lower the knee section of the bed. Similarly, the connection 9 completes the circuit to the head-up motor HUM while the connection 10 HDM allows the head motor to lower the head section of the bed. The connection 11, BUM, allows the bed motor to elevate the bed, and the connection 12, BDM, lowers the bed.

The connections 7 to 12 permit the operation of the particular motor or combination of motors upon the placing of the circuit's switches in the appropriate configuration. Which motors operate under various positionings of the switches depends upon the logic components contained in the circuit. These logic components specifically include the NOR gates Z1 to Z12 and the NAND gates Z13 to Z19. The operation of the various motors in their two directions find expression in logic statements couched in terms of Boolean algebra. A general description of this algebra appears in *Digital Electronics for Scientists* by H. V. Malmstadt and C. G. Enke, W. A. Benjamin, Inc. (New York, 1969).

Writing these expressions requires the adoption of conventions for labeling the various positions of the switches and the conduction states of the windings of each motor. Thus, for the motors, the labels attached to the connections 7 to 12 of the bus bar B2 will indicate that current flows through the indicated winding. For example, the symbol KUM will signify that current flows through the knee motor up winding.

For the patient-actuated switches, or first category, the label given to the switches in the figure will represent the closing or actuation of that switch. Accordingly, the symbol KU will indicate that the patient has actually closed the knee-up KU switch. Conversely, placing a bar over the same symbol, such as $\overline{KU}$, will signify the opposite, or that the KU switch remains open and not actuated by a patient.

The same convention will apply to the second and third categories of switches including the contour-up CU, contour-down CD, the nurse's bed-up BU-N, and the nurse's bed-down BD-N switches. Similarly, the lock-out bed LO-B, the lock-out head LO-H, and the lock-out knee LO-K switches will have the symbol used in the drawing when the nurse has closed those switches to preclude the indicated motors from operating. In the normal configuration, which allows the patient to adjust these bed sections, the symbols will have bars over the top such as $\overline{LO\text{-}B}$, $\overline{LO\text{-}H}$, and $\overline{LO\text{-}K}$.

The notations L-KU, L-KD, L-HU, L-HD, L-BU, and L-BD without the bar will indicate that the relevant portion has reached one of its limits. The symbol will have the bar when the bed section has not reached that particular limit. In FIG. 1, the switches actually open at the limit but remain closed between the limits.

Moreover, the symbol "+" will indicate the choice of one of several events and generally bears the label of "OR." Accordingly:

$$A+B=C \tag{1}$$

reads as "A or B produces C" and signifies that either A or B will produce the indicated result of C. Additionally, the symbol "·" indicates "AND" and requires the simultaneous occurrence of two events to produce a specific result. Thus:

$$A\cdot B=C \tag{2}$$

requires the simultaneous occurrence of A and B before the event C can take place and reads as "A and B together produce the event C."

Following these conventions, in FIG. 1A, then, the operation of all of the motors in FIG. 1A, except the bed motor down BDM have expressions given by the following five equations:

$$KUM = [KU + (CU \cdot HU)] \cdot \overline{(L - KU + LO - K)} \cdot \overline{[KD + (CD \cdot HD)] \cdot \overline{L - KD}} \tag{3}$$

$$KDM = [KD + (CD \cdot HD)] \cdot \overline{(L - KD + LO - K)} \cdot \overline{[KU + (CU \cdot HU)] \cdot \overline{L - KU}} \tag{4}$$

$$HUM = HU \cdot \overline{(L - HU + LO - H)} \cdot \overline{(HD \cdot L - HD)} \tag{5}$$

$$HDM = HD \cdot \overline{(L - HD + LO - H)} \cdot \overline{(HU \cdot L - HU)} \tag{6}$$

$$BUM = (BU + BU - N) \cdot \overline{(L - BU + LO - B)} \cdot \overline{[(BD + BD - N) \cdot \overline{L - BD}]} \tag{7}$$

Thus for example equation (3) tells when the knee motor up KUM will operate. That equation consists basically of three terms. All three of those terms must occur simultaneously in order for the knee motor up KUM to function. The first term, [KU+(CD·HU)] requires the actuation of one of two switches. It says that the patient must depress either the knee-up KU switch or the head-up HU switch, with the latter occurring at a time that the contour-up CU switch remains closed. In other words, to operate the knee motor up KUM, the patient must depress the knee-up KU switch or he must actuate the head-up HU switch at a time that the contour-up CU switch has closed.

The second term in the equation, $(\overline{L\text{-}KU+LO\text{-}K})$ simply requires that at the time that the patient depresses the appropriate switch, the knee section must not have already reached its upward limit. Additionally the knee lock-out switch LO-K must not have been placed in operation. Either of these latter two conditions will effectively prevent the knee motor up KUM from operating.

The last term in equation (3), $\overline{[KD+(CD\cdot HD)]\cdot\overline{L\text{-}KD}}$ relates to the actuation of switches which would cause the knee motor to lower the knee section. These terms also appear in equation (4) without the bar to indicate that they would result, in appropriate circumstances, in the knee motor down KDM operating. These terms in the equation for the knee motor up KUM provide that the knee motor will not function should switches causing the motor to operate in both directions receive simultaneous actuation. Such a condition would send current through both the forward and the reverse windings on the motor, resulting in substantially no motion of the knee section of the bed. The logic of the circuit prevents this from happening.

The presence in the circuit of FIG. 1A of the NAND gate Z13, the diode CR5, the capacitor C2 and the resistor R2 modifies the operation of the bed motor down BDM. These components constitute a memory which continues the operation of the bed motor down even though the bed-down BD or the nurse's bed-down BD-N switches no longer receive actuation. This allows the operator to place the bed in its lowest position by only momentarily contacting either of these switches. The operator need not maintain contact with the switch during the time that the bed motor down BDM lowers the bed. As a result, the statement of the operation of the bed motor down BDM does not submit to a simple equation such as those given above for the other motors. Rather, it may simply take the form of the statement as follows:

$$BDM : (BD + BD - N) \cdot (\overline{L - BD + LO - B}) \quad (8)$$

$$[\overline{(BU + BU - N) \cdot L - BU}] \longrightarrow$$

$$L - BD + (BU + BU - N) \cdot (\overline{LO - B + L - BU})$$

This statement says that the bed motor down BDM operates from the time that the conditions to the left of the arrow prevail until the conditions on the right of the arrow occur.

In operation, the NOR gates Z1 to Z6 directly receive the potential voltage provided by the filter consisting of the of the resistor R1 and the capacitor C1. This applies during the time that the manually actuable switches remain open. For example, the NOR gate Z1 receives the voltage across the resistor R3 and then the resistors R4 and R5. No substantial voltage drop occurs across the resistor R3 since it connects first to the knee-up KU switch which, as stated above, remains open. Accordingly, no current can flow through the switch to cause a potential drop across the resistor R3.

Furthermore, relatively little current can flow from the resistor R3 through the NOR gate Z1 to develop an appreciable potential drop through that current path. Consequently, the voltage appearing at the connection of the resistor R3 to the resistors R4 and R5 and at the input of the NOR gate Z1 equals the supply voltage at the terminal TER. Similarly, with the other actuable switches remaining open, the NOR gates Z2 to Z6 also experience the voltage appearing at the terminal TER across their resistors R6 to R20.

Depressing one of the switches will cause the voltage at the appropriate NOR gate to drop from the supply voltage to approximately ground. For example, as the diagram shows, closing the knee-up KU switch provides a direct path to ground across the limit knee-up L-KU switch to the connection between the resistor R3 and the resistors R4 and R5. This ground voltage then passes directly to the NOR gate Z1. The potential drop between the supply voltage at the terminal TER and the ground voltage occurs, upon the depression of the knee-up switch KU, across the resistor R3.

Thus, the inputs to the NOR gate Z1 may occupy one of two states. It may "see" the supply voltage and thus occupy the so-called "ONE" state. When the knee-up KU switch closes, the inputs to the NOR gate Z1 then experience the ground potential and occupy the "ZERO" state. The ONE and the ZERO states represent the two inputs to the NOR gate Z1 which can affect its output. When both inputs occupy the ZERO state, the NOR gate Z1 has an output of ONE. When either one or both of the inputs occupies the ONE state, then the NOR gate Z1 provides a ZERO output.

The limit switches prevent the inputs to the appropriate NOR gates Z1 to Z6 from going to the ZERO state, or equivalently, ground potential, upon the closing of the actuable switch. Thus, if the knee section of the bed has reached its uppermost position, the limit knee-up L-KU switch opens. This breaks the connection from the NOR gate Z1 to ground potential across the knee-up KU switch. Consequently, the connection between the resistor R3 and the resistors R4 and R5 remains at the supply voltage, or in the "ONE" state, notwithstanding the actuation of the knee-up KU switch. Similarly, the head lock-out LO-H and the bed lock-out LO-B switches prevent the inputs to the appropriate NOR gates from going to ZERO. The operation of the knee lock-out LO-K switch receives discussion below.

The operation of the contour-up CU and the contour-down CD switches also follows immediately from the above discussion. Closing the contour-up CU switch connects the NOR gate Z1 to the head-up HU switch. With the contour-up CU switch closed, depressing the head-up HU switch allows current to flow across the resistor R3 and through the limit knee-up L-KU switch and the diode CR6. It then passes through the contour-up CU switch and down across the head-up HU switch to ground, passing, on its way, through the head lock-out head LO-H switch. Thus, with the contour-up CU switch closed, depressing the head-up HU switch results in the inputs to the NOR gate 21, associated with the knee motor up KMU, going to ZERO. Thus, the contour-up CU switch, when closed, results in the head-up HU switch having the same effect upon the NOR gate Z1 as does closing the knee-up switch KU. Naturally, closing the head-up HU switch continues to affect the NOR gate Z3 by placing its inputs in the ZERO state in order to operate the head motor up as well as the knee motor up.

Conversely, closing the contour-up CU switch does not result in the head motor raising that section of the bed upon the closing of the knee-up KU switch. The diode CR6, when the knee-up KU switch closes, prevents current flowing to ground from the NOR gate Z3. Consequently, the NOR gate Z3, associated with the head motor up HUM, remains in its ONE state. Thus, the head motor up HUM will not operate upon the closing of the knee-up KU switch even with the contour-up CU switch closed.

Similarly, the contour-down CD switch, when closed, results in the knee section of the bed lowering upon the actuation of the head-down HD switch. Again, though, the diode CR7 prevents the reverse occurrence of the head section of the bed lowering upon the actuation of the knee-down KD switch.

The two inputs to each of the NOR gates Z1 to Z6 connect across separate resistors to a common point. One of them, however, connects directly to the common point while the other, along the route, connects to a capacitor coupled to ground. Thus, for example, the upper input to the NOR gate 21 connects across the resistor R4 to the resistor R3. The lower input to the NOR gate Z1 connects across the resistor R5 to the same connecting point. However, coupled between the resistor R5 and the lower input to the NOR gate Z1 lies one connection of the capacitor C3.

Upon the closing of the knee-up KU switch, the connection between the resistor R3 and the resistors R4 and R5 immediately drops to ZERO. Similarly, the upper input to the NOR gate Z1 also immediately drops to ZERO across the resistor R4. The lower input, however, does not immediately switch to ZERO. Connecting the capacitor C3 between the resistor R5 and the lower input to the NOR gate Z1 delays the time that the lower input to the NOR gate Z1 goes to ZERO. The output of the NOR gate Z1 cannot respond to a change in the inputs until both have gone to ZERO. Consequently the capacitor C3 introduces a delay between the closing of the knee-up KU switch and the time that the output of the NOR gate Z1 responds. As a result, the capacitor C3 introduces a delay between the time that the knee-up KU switch closes and the time that the knee motor up KUM operates to raise that section of the bed.

Similarly, the capacitor C4 causes the knee motor down KDM to delay in lowering the bed in response to the closing of the knee-down KD switch. The delays provided by the capacitors C3 and C4 allow the knee motor, when traveling in one direction, a time to stop before the actuation of the other knee switch causes it to reverse its direction. It also permits currents and energy within the one motor winding to dissipate prior to the time that current passes to the motor's other or reverse winding. This dissipation of stored-up energy has a very beneficial effect upon the components coupled to the motor, especially the triacs which control its flow of current, as discussed below.

Similarly, the capacitors C5 and C6 introduce similar delays in the operation of the motor moving the head section of the bed. When switching from the head-up HU switch to the head-down HD switch, the capacitor C6 introduces a slight delay to allow the head motor to stop briefly. The capacitors C7 and C8 accomplish the same results for the motor controlling the overall height of the bed.

The capacitors C3 to C8 illustrate one of the important advantages of using CMOS logic components in the hospital bed circuit. CMOS components, in particular, have a high input impedance. This high input impedance allows the use of the high value resistors R4, R5, R7, R8, R10, R11, R13, R14, R16, R17, R19, and R20 at the inputs of the NOR gates Z1 to Z6 without losing the input signals. These large resistors, however, only require comparatively small capacitors to achieve desired delay times. Thus, 0.47 microfarads for the capacitors C3 to C8 and 68 killiohms for the resistors R5, R8, R11, R14, R17, and R20 will produce a delay of 16 milliseconds. The smaller value capacitors are more stable, less expensive, and physically less bulky.

As stated above, the high impedance of CMOS components permits the use of high-value resistors at their inputs. Those large resistors in turn, benefit and protect these very same CMOS chips. A person touching one of the switches may introduce an extremely brief but large charge of static electricity. This charge could deleteriously affect the CMOS components. The large resistances at their inputs, however, reduce the static charges to non-destructive levels. Thus, the resistors at the lower inputs to the NOR gates Z1 to Z6 cooperate with the capacitors C3 to C8 to produce appropriate time delays. These same resistors along with those connected to the upper inputs of the same gates, also protect the CMOS circuit components from static discharges.

As an additional feature, the CMOS components do not require a regulated supply voltage. They continue to function properly even during appreciable variances in the d.c. voltage which powers them. This has particular benefits for the hospital beds which can experience varying voltages during times of "brown-outs" and other power limitations.

Not requiring a regulated power supply, the CMOS components dispense with voltage regulators and the energy they consume. Moreover, the CMOS units devour very little electricity themselves. Thus, the CMOS logic circuit requires very little power to operate properly. This energy saving becomes particularly important, since the logic portions of the circuit continuously operates even when the bed's motors do not. This saving can represent a large amount of energy for a hospital having hundreds of beds "plugged in" at the same time.

As suggested above, the NAND gate Z13 and the diode CR5 provide a memory circuit which continues to lower the bed even after the release of the bed-down BD or the nurse's bed-down BU-N switches. Once started by a momentary tap of either of these switches, the bed continues to descend until it reaches its lower limit and opens the limit bed-down L-BD switch. Alternatively, the actuation of the bed-up BU or the nurse's bed-up N-BU switches will stop the bed's descent. In the absence of these components, the release of the bed-down BD or the nurse's bed-down BD-N switch restores the inputs to the NOR gate Z6 to the ONE state.

However, with the bed-down BD switch, for example, depressed, the NOR gate Z6 sends a ONE output to the upper input of the NAND gate Z13. Furthermore, for the bed to move downward, the inputs to the NOR gate Z5 must remain ONE, which they do while the bed-up BU and the nurse's bed-up switches BU-N lie open. With the two inputs to the NOR gate Z5 in the ONE state, the lower input to the NAND gate Z13 goes to ONE since it connects directly to the upper input of the NOR gate Z5.

These two ONE inputs to the NAND gate Z13 force its output to ZERO. This travels through the diode CR5 and across the resistor R2 to force the inputs to the NOR gate Z6 to remain in the ZERO state. Thus, the NAND gate Z13 and the diode CR5 maintain the inputs to the NOR gate Z6 in the ZERO state, which causes the bed motor to continue to lower the bed.

When the bed has reached its lowest position, the limit bed-down L-BD switch opens. This removes the ground connection to the inputs to the NOR gate Z6. It also isolates these inputs from the maintain-bed-down circuit consisting of the NAND gate Z13 and the diode CR5. Thus, the inputs to the NOR gate Z6 may revert to the ONE state causing its output to go to ZERO to stop the bed motor down BDM from operating further.

Actuating the bed-up BU or the nurse's bed-up BU-N switches, on the other hand, induces the upper input, in particular, of the NOR gate Z5 to drop to ZERO. It also directly places the lower input to the NAND gate Z13 in the ZERO state. Consequently, the output to the NAND gate Z13 places the inputs to the NOR gate Z6 in the ONE state to turn off the bed motor down BDM. The diode CR5 prevents a ONE output of the NAND gate Z13 from maintaining the inputs to the NOR gate Z6 at ONE notwithstanding the closing of the bed-down BD or the nurse's bed-down BD-N switch.

The resistor R2 and the capacitor C2 prevent static electricity charges introduced at the circuit's switches from reaching the output of the CMOS NAND gate Z13. As with the similar components for the NOR gates Z1 to Z6, they act as a filter to protect the indicated component.

The inputs to the NOR gate Z1 couple to the knee-up KU switch. Its outputs couple to both the NAND gate Z14 and the NOR gate Z8. Similarly, the inputs to the NOR gate Z2 connect to the knee-down KD switch. Its output couples to the NAND gate Z15 and to the NOR gate Z8. Both of the NOR gates Z7 and Z8, moreover, couple to the output of the pulse generator Z20.

The generator Z20 provides the pulses necessary for the pulse transformers T2 through T7 to turn on the various motors of the bed. The magnitudes of the resistors R21 and R22 and the capacitor C9 determine the frequency and the duration of the pulses provided. The components listed in the Table produce a pulse rate of 5 kilohertz and each pulse has a duration of 15 microseconds.

The pulse generator Z20, although a non-CMOS component, nonetheless, also does not require a highly regulated power supply to operate properly. Thus it can function well in the same circuit as the CMOS logic components and dispense with the need for a voltage regulator.

The NOR gate Z7 has an output of ZERO except when both of its inputs occupy the ZERO state. The lower input to the NOR gate 27 goes to ZERO periodically upon the receipt of the negative pulses from the generator Z20. The upper input to the NOR gate 27 can only exist at ZERO when the NOR gate Z2 has a ZERO output. This in turn requires ONE inputs to the NOR gate Z2 which can only occur when the knee-down KD switch remains open.

Thus, the NOR gate Z7 combines two functions into the eventual operation of the knee motor up KUM. First, it introduces the pulsing from the generator Z20 required to transfer a signal through the pulse transformer T2. Second, it prevents operation of the knee motor up should the patient have closed either the knee-down KD switch or the head-down HD switch with the contour-down CD switch engaged. This latter aspect provides the basis, expressed in the equations above, of not permitting current to flow to the forward and reverse windings of a particular motor simultaneously.

The output of the NAND gate Z14 can drop to ZERO only when both of its inputs occupy the ONE state. One of its inputs comes from the output of the NOR gate 27. However, as stated above, the NOR gate Z7 can have a ONE output only during the receipt of a ZERO pulse from the generator Z20 and the nonactuation of the switch which would induce the knee motor to lower the knee section.

The NAND gate Z14 receives its other input from the output of the NOR gate Z1. That goes to ONE upon the depressing of the knee-up KU switch or at the head-up HU switch with the contour-up CU switch closed. With the bed's knee section below its highest position, the second input to the NAND gate Z14 goes to ONE upon the actuation of a button to raise the knee. Thus, the output of the NAND gate Z14 drops to ZERO to cause the knee motor to raise the knee section upon the actuation of a switch to raise the knee section of the bed without the simultaneous actuation of a switch to lower it. Instead of assuming a steady state ZERO condition, the output of the NAND gate Z14, under these conditions, pulsates between ZERO and ONE due to the generator Z20.

When the NAND gate Z14 produces a negative, or ZER0, pulse, it travels through the diode CR8 and turns on the transistor Q1. While the transistor Q1 remains on, current flows from the supply at the terminal TER through the lock-out knee LO-K switch, assuming it closed, and across the resistor R23. It then goes to the primary winding P2 of the transformer T2, through the transistor Q1, and then to the ground. However, the pulsing of the generator Z20 only allows the transistor Q1 to go on in pulses of the same duration and frequency as that produced by the generator Z20. Consequently, the primary P2 of the pulse transformer T2 receives a pulsing current, again, of the same frequency and duration as provided by the generator Z20. As stated above, however, the duration and frequency of these pulses depends upon the selection of the resistors R21 and R22 and the capacitor C9 and creates a voltage in the secondary S2.

The voltage thus induced in the secondary S2 provides a negative potential difference between the gate of the triac Q7 and its main connections. This potential difference turns on the triac Q7 and allows current to flow to the connection 7 for the knee motor up KUM and thus raise the knee section of the bed.

The current flowing through the triac Q7 and thus to the knee motor up KUM comes from the usual house current of 60 Hertz. However, twice during each cycle of that current, the current itself stops and reverses direction. Each time it does so, the triac Q7 turns off. However, shortly after the triac Q7 turns off, the current in the secondary S2 then turns it on again. If the pulse generator Z20 provides a large number of pulses for each cycle of house current, very little time can elapse from the triac Q7 turning off and when the next pulse will turn it on again. On the other hand, were the generator Z20 providing the same 60 Hertz as the house current, a different situation could result. A large portion of the cycle of the house current could pass after Q7 turned off until the next pulse through the transformer T2 could turn it on again. Thus, the generator Z20 should have a relatively high frequency.

Selecting a high pulse frequency for the generator Z20 also produces a further and more important benefit. The pulse transformer T2 may respond well to the high frequency rectangular pulses of the generator Z20 but very poorly to the 60 Hertz current of the knee motor up KUM. As a result, it will efficiently transfer energy from the high frequency current in the primary P2 to its secondary S2. However, it will respond poorly to the low frequency current used by the knee motor. Consequently, the low frequency current in the secondary S2 will not transfer back to the primary P2. At least the amount that will so transfer represents no danger to the patient. Accordingly, the pulse transformer T2 insulates the patient against the high voltage required by the knee motor up KUM. Its responsiveness to the high frequencies of the generator Z20 compared to its relative insensitivity to the low 60 Hertz line frequencies allows it to perform this function.

The above discussion also makes clear the operation of the knee lock-out LO-K switch. To disenable the knee motor, the nurse or attendant simply opens that switch. When thus opened, it prevents the flow of current from the terminal TER to the primary winding P2 of the transformer T2, regardless of the configuration of the knee switches. Consequently, the patient depressing, for example, the knee-up KU switch cannot operate the knee motor.

To assist the pulse transformer T2 in performing its safety function, its secondary winding S2 consists of a thin wire. If a high current passes through the secondary S2, it will consequently melt and fuse. In this state, the transformer T2 cannot transfer energy from the secondary S2 back to the primary P2 and into the circuit contacted by the patient. This guards against an extremely high current surging through the motors approaching the area of the circuit that could touch a patient.

The transistor Q1 operates as a buffer between the CMOS logic components and the pulse transformer T2.

The CMOS components, including the NOR gates Z1, Z7 and Z8 and the NAND gate Z14 do not have sufficient current output to drive the transformer T2. However, they can control the transistor Q1 which in turn does provide sufficient current across its emitter-collector junction to power the pulse transformer T2.

The diode CR8 performs a dual function in the particular circuit shown. When the knee motor reverses from one direction to the other, it may create a strong negative current spike. This spike, or pulse, of current can pass from the secondary S2 to the primary P2 of the transformer T2. It could then travel back into the CMOS logic components and deleteriously affect them. The diode CR8 simply prevents such current spikes from reaching the CMOS components.

Furthermore, the diodes also permit the use of a single resistor, such as R23, between the supply voltage at the juncture TER and the primaries P2 and P3 of the transformers T2 and T3. Without the diodes CR8 and CR9, for example, using only the single resistor R23, and depressing the knee-up KU switch causes the transistor Q1 to turn on. As a consequence, the potential at the emitter of Q1 goes nearly to ground. However, the emitter of the transistor Q2 has a direct connection to the emitter of the transistor Q1 and consequently would also go to ground potential. With the knee-down KD switch open, the NAND gate Z15 should have an output of ONE. Without the diode CR9, the base of the transistor Q2 would accordingly occupy the ONE state or experience a potential of ten volts. This potential could cause current to flow from the base of the transistor Q2 to its emitter thus existing at ground potential. In other words, this disparity in potentials would cause the transistor Q2 to behave as a Zener diode from its base to its emitter with a five volt potential drop. Thus, current could flow from the base of the transistor Q2, to its emitter, and through the primary winding P3 of the transformer T3. That would induce a voltage in the secondary winding S3 to turn on the triac Q8. Thus, the action of the NAND gate Z14 to turn on the triac Q7 for the knee motor up KUM could also result in turning on the triac Q8 for the knee motor down KDM.

The diode CR9, however, prevents the flow of current from the NAND gate Z15 to the base of the transistor Q2 and eventually through the primary P3. A separate remedy would involve placing additional resistors in the emitter circuits for the transistors Q1 through Q6. The diodes CR8 through CR13 obviate the need for those components, and, thus, reduce the expense of the circuit.

The NOR gates Z9 and Z10, the NAND gates Z16 and Z17, the diodes CR10 and CR11, and the transistors Q3 and Q4 perform a similar function for the head motor of the bed. They provide current to the primary windings P4 and P5 of the transformers T4 and T5 from the supply potential at the terminal TER through the resistor R24. Consequently, one of the secondaries S4 or S5, as appropriate, can pass current to the triacs Q9 or Q10 to turn on the head motor up HUM or the head motor down HDM respectively.

Similarly, the NOR gates Z11 and Z12, the NAND gates Z18 and Z19 along with the diodes CR12 and CR13 control the transistors Q5 and Q6. They in turn direct the flow of current through the resistor R25 and through one of the primaries P6 or P7 of the transformers T6 and T7 to produce a voltage in either of the secondaries S6 or S7. The induced voltage can turn on either the triac Q11 or the triac Q12, as appropriate, to operate the bed motor up BUM or the bed motor down BDM depending upon the switch actuated.

The connections 4 and 5 of the bus bar B2 reference the knee motor KM and the bed motor BM to the neutral lead N. Conversely, the connection 6 references the head motor HM to the phase lead PH. Opposing the motors in this fashion allows the leakage currents to counteract, rather than add to each other to produce an overall lower leakage current.

The triac Q13 assists in that effort. With all of the triacs Q7 through Q12 turned off, the only potential drop that can exist across the resistor R26 would derive from the leakage currents through the various bed motors. However, that does not induce a sufficiently large voltage drop across the resistor 26 to turn on the triac Q13. Consequently, it acts as an open switch to limit the amount of leakage current. When one of the triacs Q7 through Q12 turns on, the potential drop across the resistor R26 increases, and the triac Q13 turns on. This allows current to flow to the motor as needed with very little interference.

Figure 2:
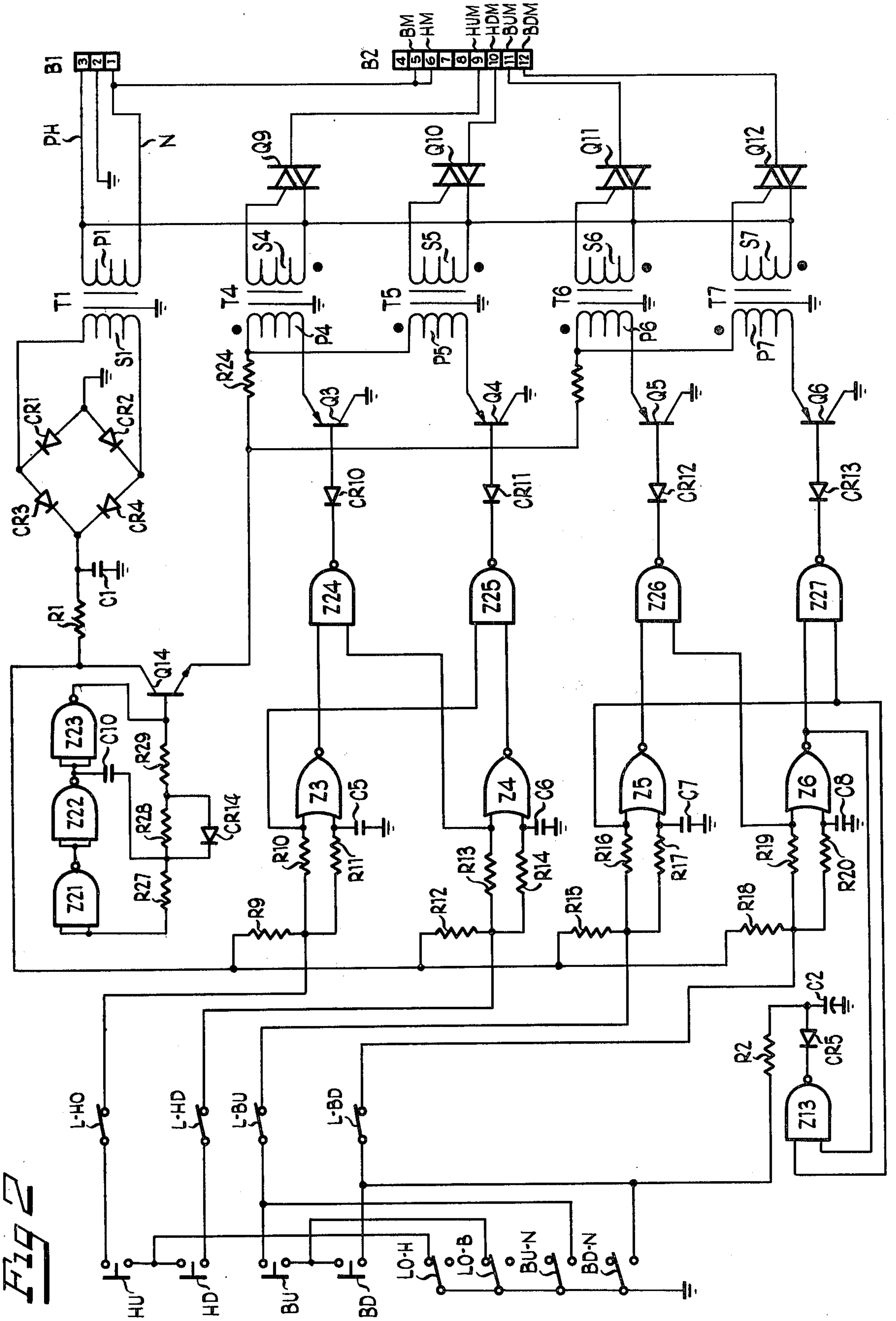
FIG. 2 shows an alternate circuit diagram for a hospital bed which again uses pulse transformers and logic controls.

The circuit in FIG. 2 displays many similarities to that in FIG. 1A. However, it does not include provisions for a knee motor.

The windings for the head motor down up HUM, the head motor HDM, the bed motor up BUM and the bed motor down BDM in response to the switches on the left-hand side will follow equations (5) through (8) given above. In fact, most of the components in the circuit of FIG. 2 have the same function as those of FIG. 1A for the analogous portions of the bed. A number of differences, however, do exist in the operations of the circuits.

The pulse generator in FIG. 2 consists of the NAND gates Z21, Z22, and Z23, which can be CMOS components, the resistors R27, R28, and R29, the capacitor C10, and the diode CR14. These components control the base of the transistor Q14, turning it on and off at appropriate intervals to provide pulses of the duration and frequency desired.

The output of the pulse generator in FIG. 2 does not travel to the input of CMOS logic components to change their outputs between the ONE and ZERO states. Rather, it provides a pulsed current directly to the primary windings P4 to P7 of the transformers T4 to T7, respectively. The logic components simply serve to control the flow of this pulsating current in response to the actuation of the switches. The arrangement shown in FIG. 2 actually allows for the elimination of the second row of NOR gates Z7 through Z12 of FIG. 1.

In FIG. 2, the NAND gate Z24, for example, has, as one of its inputs, the output of the NOR gate Z3. Its other input connects directly to the upper input of the NOR gate Z4. The former occupies the ONE state upon the actuation of the head-up HU switch at a time when the limit head-up L-HU and the lock-out head LO-H switches remain closed. This allows the operation of the head motor in the direction to raise that section of the bed. The latter input to the NAND gate Z24 occupies the positive state when the switches controlling the head motor down HDM do not induce it to operate.

With the two inputs to the NAND gate Z24 in the ONE state, its output can then drop to ZERO. As a result of the above, this occurs only upon the actuation of the head-up HU switch with the head-down HD switch remaining open.

The output of the NAND gate Z24 couples through the diode CR10 to the base of the transistor Q3. A ZERO output from this gate turns on the transistor Q3. This allows the pulsing current from the transistor Q14 to flow through the resistor R24 and the primary winding P4 of the pulse transformer T4. It accordingly induces a voltage in the secondary winding S4 which turns on the triac Q9 to allow current to flow to the head motor up HUM. Similar remarks apply to the operation of the head motor down HDM, the bed motor up BUM, and the bed motor down BDM.

Figure 3:
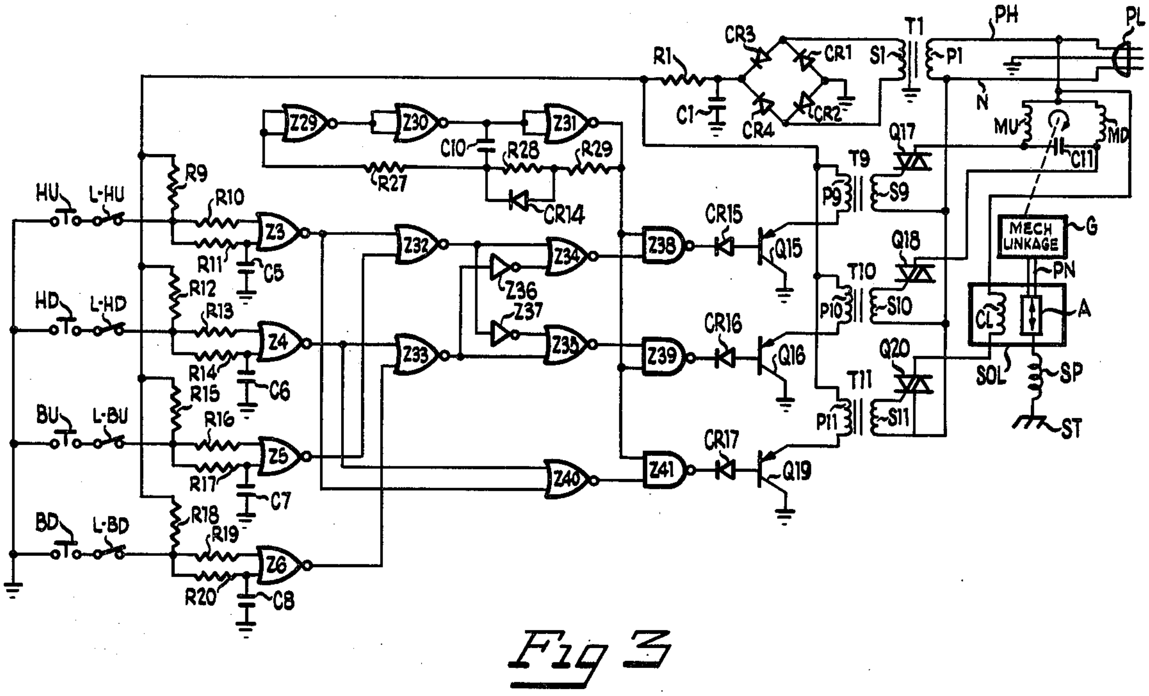
FIG. 3 displays a circuit diagram for a hospital bed with a single motor and a solenoid to adjust two different bed sections.

As with FIG. 2, the circuit of FIG. 3 applies to a bed which has only adjustable head and bed sections. However, it employs a single motor and a solenoid with a mechanical linkage G to move both of the bed sections. The motor has a motor-up MU and a motor-down MD winding.

The circuit has the head-up HU, the head-down HD the bed-up BU, and the bed-down BD switches along with the appropriate limit switches. It does not display the lock out switches, although it could incorporate them in the same fashion as with the prior figures. The circuit receives its power from the plug PL which provides a.c. current to the transformer T1. The bridge rectifier composed of the diodes CR1 through CR4, the capacitor C1, and resistor R1 provide the d.c. filtered voltage. The circuit of FIG. 3 utilizes the NOR gates Z29 to Z31 along with the resistors R27 to R29, the capacitor C10, and the diode CR14 as the pulse generator for the transformers T9 to T11.

The operation of the circuit of FIG. 3 follows the following four equations:

NAND gate Z38 incorporates the pulses from the generator and provides a control signal to the base of the transistor Q15. Consequently, the transistor Q15 turns on and off at the frequency of the pulse generator to pass energy through the transformer T9 to the gate of the triac Q17. When the triac Q17 turns on in response to the pulses from the transformer T9, the motor-up MU winding activates to raise the appropriate section. Similar remarks apply to the NAND gate Z39, the transistor Q16, the transformer T10, and the triac Q18 to actuate the motor-down MD winding.

Whether the motor-up MU or the motor-down MD winding changes the position of the head or the bed depends upon the configuration of the mechanical linkage G during the time the motor is in operation. Depressing either the head-up HU or the head-down HD switches sends a ONE signal from the outputs of the NOR gates Z3 or Z4, respectively, to the input of the NOR gate Z40. In turn, the output of the NOR gate Z40 drops to ZERO which allows the NAND gate Z41 to turn on and off in response to the generator's pulses.

The pulsing of the output of the NAND gate Z41 between ZERO and ONE travels across the diode CR17 to the gate of the transistor Q19, turning it on and off in response. As before, this action of the transistor Q19 results in the transference of energy from the primary P11 winding of the transformer T11 to its secondary S11 to turn on the triac Q20. The current passing through the triac Q20 also travels to the coil CL of the a.c. solenoid SOL. There, the current moves the arma- $$\text{“}HUM\text{”} = MU \cdot G = HU \cdot [\overline{L - HU + (HD \cdot \overline{L - HD})}] \quad (9)$$

$$\text{“}HDM\text{”} = MD \cdot G = HD \cdot [\overline{L - HD + (HU \cdot \overline{L - HU})}] \quad (10)$$

$$\text{“}BUM\text{”} = MU \cdot \overline{G} = BU \cdot \overline{[L - BU + (BD \cdot \overline{L - BD}) + (HU \cdot \overline{L - HU} + (HD \cdot \overline{L - HD})]} \quad (11)$$

$$\text{“}BDM\text{”} = MD \cdot \overline{G} = BD \cdot \overline{[L - BD + (BU \cdot \overline{L - BU}) + (HU \cdot \overline{L - HU}) + (HD \cdot \overline{L - HD})]} \quad (12)$$

The terms, "HUM", "HDM", "BUM" and "BDM" appear in quotation marks since the circuit does not employ a head motor up separate from the bed motor up. The two functions may utilize the same winding of the same motor. The mechanical linkage, or gears, G determines which section actually raises. Thus, the symbols in the quotation marks only indicate the corresponding function achieved with beds having a separate motor for each adjustable section.

The middle terms in the equations signify the actual operation of the bed. Thus, equation (9) states that the motor-up MU winding and the gear linkage (under the influence of the solenoid SOL) will operate when the conditions on the right side of equation (9) are satisfied. When this occurs, though, the head section of the bed will rise, as suggested by the symbol "HUM".

Thus, depressing either the head-up HU or the bed-up BU switches will cause the motor-up MU winding to receive current and operate to raise the indicated bed section. This, of course, assumes first that that section has not reached its upper limit of travel. Second, the patient must not have simultaneously actuated the button that would cause the same bed section to travel in both directions. Similarly, depressing the head-down HD or the bed-down BD switch while the indicated section lies above its lower position will cause the motor-down MD winding to receive current.

The control of the motor-up MU and the motor-down MD windings proceeds through the NOR gates Z32 to Z35 as well as the inverters Z36 and Z37. The ture A and its linkage pin PN against the action of the spring SP. It consequently places the mechanical linkage G in the position in which the operation of the motor will move the head section of the bed.

With neither the head-up HU nor the head-down HD switches depressed, the outputs of the NOR gates Z3 and Z4 provide ONE inputs to the NOR gate Z40. As a result, the output of the NOR gate Z40 goes to ZERO and, thus, the output of the NAND gate Z41 to ONE regardless of the pulses received by the other input of the NAND gate Z41. The ONE output of the NAND gate Z41 keeps the transistor Z19 turned off. Consequently, energy flows through the transformer T11 to turn on the triac Q20 to provide current to the coils CL of the solenoid SOL. Then, the spring SP, tied to the stationary object ST, returns the armature A, the pin PN, and, thus, the mechanical linkage G to the position where the motor affects the bed level and not the head section.

Other circuits may also make use of a solenoid to control which of several bed section will move under the influence of a particular motor. For example, a circuit very similar to that of FIG. 3 can allow a bed with three sections, such as in FIG. 1A, to move all of its sections with a single motor. That would require, of course, additional solenoids to mechanically link the appropriate bed section to the motor. The circuit would then also incorporate further logic components to operate the solenoids and to prevent them from receiving contradictory signals.

Moreover, the motor may have the capacity to operate more than a single bed section at a time. To take advantage of that, the circuit may include a separate solenoid for each bed section. The associated mechanical linkage may then connect more than a single bed section to the motor if the operator so desires. Consequently, for example, the motor may raise both the head and the knee sections of the bed at the same time. As a further example, the motor may have sufficient power and the circuit sufficient components to lower the head, the knee, and the bed sections simultaneously.

Figure 4:
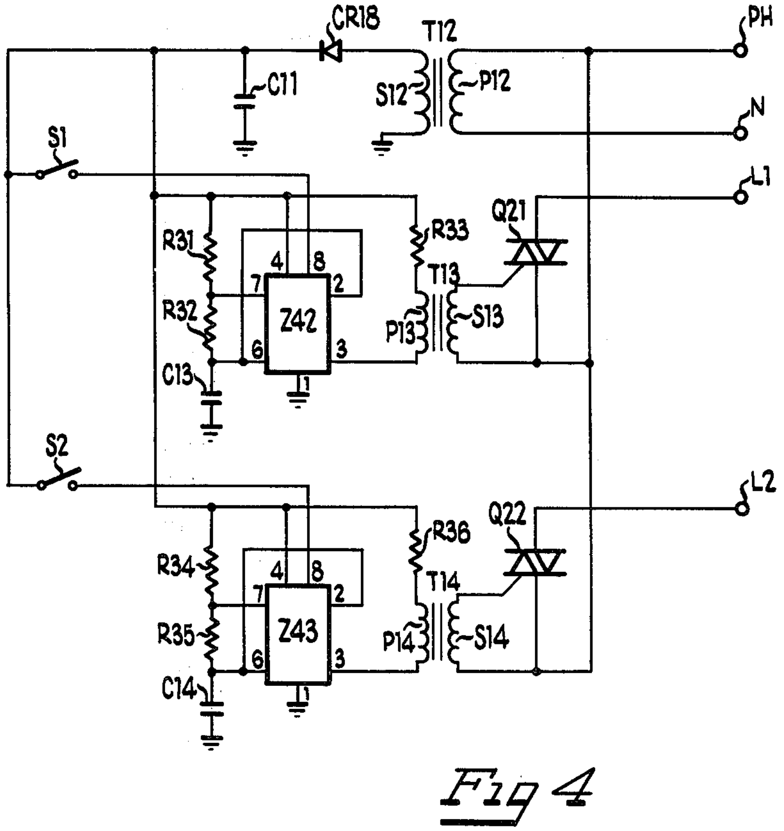
FIG. 4 gives a schematic for a switching device using pulse transformers for electrical safety.

FIG. 4 shows a simple circuit for controlling the operation of two loads L1 and L2 by the two switches S1 and S2. As with the prior figures, however, the pulse transformers T13 and T14 maintain the switches S1 and S2 at current and voltage levels considered safe for direct contact by a patient. The power transformer T12 steps down the voltage provided to its primary winding P12 provided by the line connections PH and N. The induced voltage on the secondary winding S12 itself has a magnitude no greater than that safe for a human being to touch.

The diode CR18 provides half wave rectification of the a.c. voltage and the capacitor C12 achieves some filtering. The switch S1, when closed, connects the filtered voltage to the input terminal 8 of the pulse generator Z42. When the terminal 8 receives that potential, the pulse generator Z42 provides output pulses from its terminal 3 to the primary winding P13 of the transformer T13. The resistors R31 and R32 and the capacitor C13 determine the frequency and duration of these pulses.

The transformer T13 transfers the voltage from the pulses in its primary P13 to its secondary S12. This induced voltage turns on the triac Q21 which then allows current to flow to the load L1.

Should the switch S1 remain open, the generator Z42 does not provide pulses at its terminal 3 and consequently the triac Q21 remains off. Under these circumstances, no current flows to the load L1. Similar remarks apply to the circuits between the switch S2 and its load L2.

Thus, the pulse transformers T13 and T14 again isolate the switches S1 and S2 from the current and voltages employed by the loads L1 and L2. The circuit, however, makes no use of logic components other than the switches S1 and S2 themselves.

The table lists components that will operate satisfactorily in the circuits shown.

Table

Components Used in the Figures

| Component | Identification |
|---|---|
| C1 | 330 μF |
| C2, C9, C13, C14 | .01 μF |
| C3-C8 | .47 μF |
| C10 | .001 μF |
| C12 | 100 μF |
| CR1-CR4 | 1N4004 |
| CR5-CR17 | 1N4148 |
| CR18 | 1N4001 |
| Q1-Q6, Q15, Q16, Q 19 | 2N3906 |
| Q7-Q13, Q17, Q18, Q20 | SC146D5 |
| Q14 | 2N2222 |
| R1 | 3.0 Ω |
| R2 | 470 Ω |
| R3, R6, R9, R12, R15, R18 | 4.7 K Ω |
| R4, R7, R10, R13, R16, R19 | 10 M Ω |
| R5, R8, R11, R14, R17, R20 | 68 K Ω |
| R21, R31, R34 | 22 K Ω |
| R23-R25, R33, R36 | 82 Ω |
| R26 | 130 Ω |
| R27 | 100 Ω |
| R28 | 150 Ω |
| R29 | 10 Ω |
| T1, T12 | 290-12291 |
| T2, T11, T13, T14 | 290-12290 |
| Z1-Z12, Z229-Z35, Z40 | MC 140001CP |
| Z13-Z19, Z21-Z27, Z38, Z39, Z241 | MC 14011CP |
| Z42, Z43 | NE 555 |
| Z20 | UA 555TC |

Accordingly, what is claimed is:

1. In a hospital bed having:

(1) a frame;

(2) an adjustable bed section coupled to said frame movable between at least two positions relative to said frame;

(3) electric power means coupled to said bed section for moving said bed section between said positions, said power means using electric current of a first frequency;

(4) switch means having first and second configurations and coupled to said power means for controlling the actuation of said power means; and (5) safety means coupled to said switch means for limiting the amount of electric current that can pass to said switch means to below a predetermined amount, the improvement wherein said safety means comprises:

(A) interrupt means coupled to said power means, and having two states, for, in the first of said states, preventing the flow of electric current having said first frequency from reaching said power means;

(B) frequency generating means for producing an electric current of a second frequency differing from said first frequency; and (C) discriminating means, having an input and an output, with said input being coupled to said frequency generating means and said switch means and said output being coupled to said interrupt means, for, when said switch means is in said first configuration and during receipt of current of said second frequency, placing said interrupt means in the second of said states, said discriminating means allowing the passage from said input to said output of current of said second frequency but preventing the passage from said output to said input of more current of said first frequency than said predetermined amount.

2. The improvement of claim 1 wherein (a) said discriminating means passes from said input to said output said current of said second frequency only when said switch means is in said first configuration and (b) said interrupt means is in the second of said states only when said current of said second frequency passes to said output of said discriminating means.

3. The improvement of claim 2 wherein said frequency generating means has a total current output less than said predetermined amount.

4. The improvement of claim 3 wherein said discriminating means includes a pulse transformer with input connections and output connections, said output connections being connected to said output, said pulse transformer passing between said input connections and said output connections substantially no current of said first frequency and substantially all current of said second frequency applied to said connections.

5. The improvement of claim 4 wherein said frequency generating means produces said current of said second frequency with a higher frequency than said first frequency.

6. The improvement of claim 5 wherein said discriminating means includes electronic logic components coupled to said switch means, said frequency generating means, and said pulse transformer for, when said switch means is in said first configuration, preventing the flow of electric current of said second frequency to said input connections of said pulse transformer.

7. The improvement of claim 6 in a hospital bed wherein said switch means includes a plurality of switches, each of said switches having at least two positions, at least one of said switches in said first configuration of said switch means differing from the position of said one switch in said second configuration.

8. The improvement of claim 7 in a hospital bed wherein said power means includes a plurality of electric motors and said switch means includes at least two configurations for each of said motors, each of said configurations differing from each other by the position of at least one of said switches.

9. The improvement of claim 8 further including, for each of said motors, an associated pulse transformer having input connections and output connections with said output connections of said associated pulse transformer being coupled to its associated motor and said input connections of all of said associated pulse transformers being coupled to said logic means and wherein, during the time a particular motor operates, said logic means provides to the input connections of a pulse transformer associated with said particular motor electric current of said second frequency.

10. The improvement of claim 8 wherein said discriminating means includes, for each of said motors, an associated pulse transformer having input connections and output connections with said output connections of each associated pulse transformer being coupled to its associated motor and said input connections of all of said associated pulse transformers being coupled to said logic means and wherein said logic means, during the time a particular motor operates, turns on and off at a frequency of said second frequency an electric current having a frequency substantially lower than either said first frequency or said second frequency.

11. The improvement of claim 8 wherein said interrupt means includes at least one associated triac for each of said motors with the gate of each of said triacs associated with any specific motor being coupled to the output connection of the pulse transformer associated with said specific motor.

12. The improvement of claim 7 in a hospital bed in which said power means includes an electric motor and a solenoid and wherein said switch means includes at least four configurations, each of said configurations differing from each other by the position of at least one of said switches.

13. The improvement of claim 12 wherein said discriminating means includes first and second pulse transformers each with input and output connections, the output connections of said first pulse transformer being coupled to said motor and the output connections of said second pulse transformer being coupled to said solenoid, and the input connections of said first and second pulse transformers being coupled to said logic means and wherein, during the time said motor operates, said logic means provides to the input connections of said first transformer electric current of said second frequency and wherein, during the times the coil of said solenoid receives current, said logic means provides to the input connection of said second transformer electric current of said second frequency.

14. The improvement of claim 12 wherein said discriminating means includes first and second pulse transformers each with input and output connections, the output connections of said first pulse transformer being coupled to said motor and the output connections of said second pulse transformer being coupled to said solenoid and the input connections of said first and second transformers being coupled to said logic means and wherein, during the time said motor operates, said logic means turns off and on at said input connections of said first pulse transformer and at a frequency of said second frequency an electric current leaving a frequency substantially lower than either said first frequency or said second frequency and wherein, during the time the coil of said solenoid receives current, said logic means turns on and off at said input connections of said second pulse transformer and at a frequency of said second frequency, an electric current leaving a frequency substantially lower than either said first frequency or said second frequency.

15. The improvement of claim 12 wherein said interrupt means includes a first triac with its gate coupled to the output connections of said first pulse transformer and a second triac with its gate coupled to the output connections of said second pulse transformer.

16. The improvement of claim 6 wherein said logic means includes CMOS components.

17. The improvement of claim 16 further including guarding means for limiting the power reaching, at any instant, said CMOS components from static electricity introduced at said switches.

18. The improvement of claim 17 wherein said guarding means includes two resistors, with one end of said resistors being connected together and the other ends of said resistors being connected to different inputs of a particular CMOS component and further including capacitive means coupled between ground and said other end of one of said resistors.

19. The improvement of claim 18 including buffer means coupled between said CMOS components and said pulse transformer for increasing the amount of current provided to said pulse transformer.

20. The improvement of claim 19 in a hospital bed wherein said power means includes at least on reversible motor operating in first and second directions with said first and second directions being the reverse of each other and wherein said motor has at least first and second windings with said motor operating in said first direction when said first winding receives current and operating in said second direction when said second winding receives current, and further including protective means coupled between said CMOS components and said motor for preventing current spikes originating at said motor from reaching said CMOS components.

21. The improvement of claim 20 wherein said switch means includes a plurality of switches and at least three configurations, each of said switches having at least two positions, each of said configurations of said switch means differing from each other by the position of at least one of said switches.

22. The improvement of claim 21 in a hospital bed wherein said power means further includes a solenoid and said switch means includes at least five configurations, each of said configurations differing from each other by the position of at least one of said switches.

23. The improvement of claim 22 wherein said protective means includes a diode reversed biased to the passage of said current spikes from said motor to said CMOS components.

24. The improvement of claim 23 wherein said frequency generating means includes non-CMOS components.

25. The improvement of claim 24 wherein said discriminating means includes first and second pulse transformers each with input and output connections and wherein said interrupt means includes first and second triacs with the gate of said first triac being coupled to the output connections of said first pulse transformer, the main connections of said first triac being coupled to said motor, the gate of said second triac being coupled to the output connections of said second pulse transformer, the main connections of said second triac being coupled to said solenoid, and the input connections of said first and second transformers being coupled to said buffer means.

26. The improvement of claim 25 wherein said interrupt means includes a third triac and said discriminating means further includes a third pulse transformer having input and output connections with the output connections of said third pulse transformer being coupled to the gate of said third triac, the main connections of said third triac being coupled to the first winding of said motor, the main connection of said first triac being coupled to said second winding, and the input connections of said third pulse transformer are coupled to said logic means.

27. The improvement of claim 21 in a hospital bed wherein said power means includes a plurality of reversible electric motors and said switch means includes at least two configurations for each of said motors and an additional configuration, each of said configurations differing from each other by the position of at least one of said switches.

28. The improvement of claim 27 wherein said protective means includes a diode reversed biased to the passage of said current spikes from said motors to said CMOS components.

29. The improvement of claim 28 wherein said frequency generating means includes non-CMOS components.

30. The improvement of claim 29 wherein said interrupt means includes at least one associated triac for each of said motors with the gate of each of said triacs associated with any specific motor being coupled to the output connection of the pulse transformer associated with said specific motor.

31. The improvement of claim 30 wherein said discriminating means includes, for each of said motors, two associated pulse transformers having input connections and output connections with, for a specific motor, said output connections of the first of said two associated pulse transformers being coupled to the first winding of said specific motor and the output connections of the second of said two associated pulse transformers being coupled to the second winding of said specific motor and said input connections of all of said pulse transformers being coupled to said logic means and wherein, during the time a particular motor operates, said logic means provides to the input connections of one of the pulse transformers coupled to said particular motor electric current of said second frequency.

32. The improvement of claim 31 wherein said discriminating means includes, for each of said motors, two associated pulse transformers having input connections and output connections with, for a specific motor, said output connections of the first of said two associated pulse transformers being coupled to the first winding of said specific motor and the output connections of the second of said two associated pulse transformers being coupled to the second winding of said specific motor and said input connections of all of said pulse transformers being coupled to said logic means and wherein, during the time a particular motor operates, said logic means provides to the input connections of one of the pulse transformers coupled to said particular motor electric current of said second frequency.

33. A safety device for use with a circuit controllable by a person for protecting that person while controlling the flow of electric current in that circuit having a first frequency to a load, said device comprising:

(A) a switch having at least first and second configurations;

(B) frequency generating means for producing an electric current of a second frequency different from said first frequency and in an amount safe for contact with a person;

(C) interrupt means coupled to said load and having two states for, in the first of said states, preventing the flow of electric current having a first frequency from reaching said load, said interrupt means assuming the second of said states upon the receipt of current of said second frequency; and (D) discriminating means having an input and an output with said input being coupled to said frequency generating means and said switch and said output being coupled to said interrupt means for, when said switch is in said first configuration and during receipt of current of said second frequency, passing from said input to said output said current of said second frequency, said discriminating means preventing the passage from said output to said input of more than a safe amount of current of said first frequency for contact by a person, said discriminating means including a pulse transformer with input connections and output connections, said output connections being coupled to said output, said pulse transformer passing between said input connections and said output connections substantially no current of said first frequency and substantially all current of said second frequency applied to said input connections.

34. The device of claim 33 wherein said frequency generating means produces said current of said second frequency with a higher frequency than said first frequency.

35. The device of claim 34 wherein said interrupt means includes a triac with the gate of said triac being coupled to one of said output connections of said pulse transformer and one of the remaining leads of said triac being coupled to said load.

* * * * *